US011555515B2

(12) United States Patent
Nothman (10) Patent No.: US 11,555,515 B2
(45) Date of Patent: Jan. 17, 2023

(54) ACTIVE SUCTION CUP

(71) Applicant: Geko Unique Support System S.L., Santa Cruz de Tenerife (ES)

(72) Inventor: Pierre Michel Nothman, Santa Cruz de Tenerife (ES)

(73) Assignee: Geko Unique Support Systems S.L.

( * ) Notice: Subject to any disclaimer, the term of this patent is extended or adjusted under 35 U.S.C. 154(b) by 0 days.

(21) Appl. No.: 17/533,883

(22) Filed: Nov. 23, 2021

(65) Prior Publication Data

US 2022/0163059 A1    May 26, 2022

(51) Int. Cl.
   *F16B 47/00* (2006.01)
(52) U.S. Cl.
   CPC .................. *F16B 47/00* (2013.01)
(58) Field of Classification Search
   CPC .................. F16B 47/00; F16M 11/00
   USPC ... 248/683, 537, 205.5, 205.8, 206.2, 206.3, 248/309.3, 362, 363
   See application file for complete search history.

(56) References Cited

U.S. PATENT DOCUMENTS

| 1,267,270 A * | 5/1918 | Rheinlander | F16B 47/00 269/21 |
| 5,795,001 A * | 8/1998 | Burke | B65G 49/061 294/185 |
| 9,057,398 B2 * | 6/2015 | Yang | F16B 47/006 |
| 2002/0043599 A1 * | 4/2002 | Pando | F16B 47/00 248/205.8 |
| 2006/0231705 A1 * | 10/2006 | Liu | F16B 47/00 248/205.5 |
| 2016/0025264 A1 * | 1/2016 | Casagrande | F16M 13/00 248/205.9 |
| 2018/0368594 A1 * | 12/2018 | Hakim | A47G 23/0303 |
| 2019/0203759 A1 * | 7/2019 | Zimmerman | A47L 13/16 |
| 2021/0147100 A1 * | 5/2021 | Boeuf | B01D 19/0031 |
| 2022/0163059 A1 * | 5/2022 | Nothman | F16M 11/00 |

FOREIGN PATENT DOCUMENTS

| ES | 2356532 A1 | 4/2011 |
| WO | 2018/185527 A1 | 11/2018 |

* cited by examiner

*Primary Examiner* — Muhammad Ijaz
(74) *Attorney, Agent, or Firm* — Boyle Fredrickson, SC (57) ABSTRACT

An active suction cup includes a vacuum chamber provided with at least one opening with an elastic rim adapted to be applied against a surface sealingly closing the chamber vacuum, and air extraction means from inside the chamber, adapted to extract the air from inside the chamber to reduce the pressure inside the chamber so that the suction cup remains adhered to the surface. The suction cup is characterized in that the air extraction means are arranged inside the vacuum chamber and connected to a conduit that opens outside the chamber, the suction cup also comprising a pressure sensor inside the chamber to detect the pressure inside the chamber. The pressure sensor is connected to control means adapted to actuate the air extraction means if the pressure detected by the pressure sensor is greater than a predetermined maximum pressure threshold.

14 Claims, 6 Drawing Sheets

ACTIVE SUCTION CUP

CROSS-REFERENCE TO RELATED APPLICATIONS

This application claims priority to and is a continuation-in-part of Spanish utility model application U202032568, filed on Nov. 26, 2020, which granted as ES1261804 on Mar. 8, 2021, the entire contents of each is incorporated by reference.

TECHNICAL FIELD OF THE INVENTION

Active suction cup for vacuum gripping, designed for use inside or outside homes and commercial premises, intended for holding all kind of objects, such that the suction cup easily adheres to any smooth surface.

BACKGROUND OF THE INVENTION

Currently there are a multitude of display stands, both for advertising and for home, capable of holding a wide variety of objects. These display stands are often unattractive and do not attract the consumer's attention with regard to the product, since they merely use the ceiling or floor as a gripping point. The configuration and mounting system of the displays are complicated, uncomfortable and require some type of installation, which limits, hinders and makes installation difficult and expensive.

Patent application P200800509 discloses a modular display device with suction cup fastening system, composed of several parts that fit together, specially designed for use inside homes and commercial premises, intended to hold a display tray for displaying all kind of objects. The device comprises several detachable pieces that fit together. Each piece consists of a system of attachment to the smooth surface, such as glass or similar, through at least one suction cup, with an arm articulated from the lower part of the mechanism, the arm being provided with a hole in its upper part for attachment of another piece by means of a flap, and where the upper part of said other piece consists of a clamp intended to attach the display tray. This clamp of the piece has the lower side longer than the upper side, such that it confers greater rigidity to the structure, and prevents the slipping of the display tray thanks to an anti-slip fastening means provided on the lower part of said clamp. To fix the suction cup to the smooth surface, the arm, once folded, rotates with respect to the central point of the suction cup up to 90 degrees, creating a vacuum, and in such a way that, to eject the suction cup, the arm is rotated in the opposite direction.

Application WO2018185527 discloses a suction cup holding system controlled by a vacuum generator circuit intended for holding objects and adhering on any smooth surface, and comprising: a contact surface (1) including a suction cup connected to a vacuum chamber (3) by means of elastomers (2); at least two motors (9, 10) connected to said vacuum chamber by means of flexible feeding tubes (5). With this system, a display is formed using the vacuum circuit (10) assembled in a housing (20) with the shape of a rectangular parallelepiped, wherein the longest side of said housing (20) is used as a contact surface (1) including a suction cup, which is associated with the vacuum circuit.

The problem with this type of exhibitors is that the suction cup is fixed by mechanical means and it loses fixation with the surface over time, due to vacuum leakage from the suction cup. Besides, the weight that the exhibitor tray can support is not big enough to keep objects with weights over 2 Kg for a long time.

Another problem is that the shape of the vacuum chamber does not allow sufficient grip on the surface to which the suction cup is adhered.

Furthermore, according to WO2018185527, all the vacuum generating elements are outside the vacuum chamber, except for the pressure sensor. As a result the final device is not compact and is bulkier than the suction cup of the present invention.

Active suction cups are also known which are provided with vacuum generating circuits and a vacuum chamber, from which they draw air to promote attachment of the suction cup to a surface. Moreover, vacuum generator circuits formed by motors and pumps generate noise during operation, that can be annoying. To reduce the noise it is possible to use silencers, but these further increase the complexity and size of the suction cup.

It is therefore an object of the present invention to provide a compact active suction cup, capable of housing the vacuum generating components in a smaller volume than the one in the known devices, silent and allowing to be safely adhered to a surface to support objects.

Thanks to the electromechanical system that generates vacuum, a more compact and silent suction cup is obtained than the known devices, which maintains and guarantees its adherence on smooth surfaces.

Additionally, the degree of vacuum that can be generated by the electromechanical circuit of the suction cup of the present invention is higher than the one obtained with suction cups of the same size, wherein the vacuum is mechanically generated, therefore, the weight that can be supported by this system is greater than its mechanical equivalent.

DESCRIPTION OF THE INVENTION

The active suction cup of the present invention comprises a vacuum chamber and means for extracting air from inside the chamber, acting as a vacuum generating circuit, connected to a duct leading to the outside of the chamber. The vacuum chamber is provided with at least one opening with an elastic rim adapted to be applied against a surface, preferably a smooth, straight surface such as a glass, sealing the vacuum chamber. And the air extraction means are adapted to extract air from inside the vacuum chamber—through the duct—to reduce the pressure inside the chamber so that the suction cup adheres to the surface.

The duct can be a pneumatic circuit, it does not have to be a simple tube. This conduit or pneumatic circuit interconnects, for example, the motors with the valves (preferably solenoid valves).

Basically, the active suction cup is characterized in that the air extraction means (comprising motors, solenoid valve(s), pneumatic circuit), i.e. the means forming the vacuum generating circuit are arranged inside the vacuum chamber, so as to obtain not only a more compact active suction cup, since the air extraction means are located directly inside the vacuum chamber, but also a quieter one since the vacuum attenuates the noise that may be produced by the extraction means, such as motors and pumps. The suction cup is further advantageously provided with suitably programmed control means, such as a processor and memory assembly of the kind known in the art, which control the air extraction means, i.e. they actuate or stop the air extraction means as appropriate, to maintain the proper pressure level inside the chamber that will allow the suction cup to be properly attached t the surface. Thus, the suction cup further comprises a pressure sensor inside the chamber, for detecting the pressure inside the chamber. The pressure sensor is connected to the control means (such as motors) adapted to actuate the means (such as motors) of air extraction if the pressure detected by the pressure sensor is lower than a predetermined pressure threshold, i.e. if the vacuum is lower than necessary to keep the suction cup attached to the surface. In this way the control means allow to maintain the chamber pressure above the predetermined minimum pressure threshold, such as for example −60 kPa (−0.60 bar), by actuating the air extraction means if the pressure inside the chamber is lower than the pre-determined threshold, due for example to small losses (vacuum leaks), thus keeping the suction cup attached to the surface when it is active.

The fact that the air extraction means are inside the vacuum chamber produces the technical effect that the suction cup has a much more compact structure than other known devices and suction cups because of the use of the hole of the vacuum chamber to house electromechanical and electronic components as well as the ducts. According to particular embodiments some electronic components are left outside the chamber.

Outside the vacuum chamber are the storage cells, or batteries—if batteries are used—which can be rechargeable.

Another essential advantage of having the air extraction means inside the vacuum chamber is that the suction cup is much quieter, whereas if it were outside, it would be noisy due to the sound of the motors.

The present invention therefore relates to an active suction cup for holding objects of all kinds thanks to an electromechanical system which generates a vacuum and which adheres to smooth surfaces for a prolonged period of time, where prolonged time is understood to mean a period of at least several weeks, or even several months, or years.

The suction cup is specially designed for use indoors and outdoors in homes and commercial premises, to hold or exhibit objects more securely and attractively. This means that it can include, for example, lighting systems, both for shops and homes, holders for video surveillance cameras, holders for bathroom and kitchen items, shutters, loudspeakers, television screens, clothes, shoes, cameras, mobile phones, etc.

It is known that vacuum is a gas state in which the partial density of its particles is lower than that of the earth's surface atmosphere. As a rule, in pneumatics, pressure is indicated as overpressure (in relation to the ambient pressure). This also means that the vacuum is always indicated as a negative value (measured in relation to the ambient atmospheric pressure). In this specification, reference is generally made to pressure values that are always sub-atmospheric and represented by negative numerical values. Therefore, when it is stated that the pressure reaches a "minimum value" as a pressure threshold (e.g. −0.60 BAR), it means that the vacuum is the minimum necessary to hold for example a load of up to 5 kg at 60 cm from the vertical clamping plane. When reference is made to a minimum pressure value being exceeded, it means that it is necessary to increase the degree of vacuum to e.g. (−0.75 BAR).

The elastic rim of the vacuum chamber, or elastic rims, according to some particular embodiments, can be composed of any elastic material or materials, such as elastomers.

That is, it can be made of any material that can be deformed by the application of a force while the force is applied.

In this case, air extraction means are used as a vacuum generator with vacuum control by means of a pressure sensor. It is not necessary to generate the vacuum continuously, which has a favourable effect on the energy consumption of the power supply such as storage cells or batteries.

As long as the system vacuum remains within the set limits, vacuum generation is automatically deactivated and energy consumption is saved. Such energy-saving switching can be controlled by means of control devices arranged on one or more electronic boards "PCB" with one or more microprocessors.

In one embodiment, the air extraction means comprise a motor and pump assembly such that, when the motor is powered, it drives the pump to extract air from inside the chamber and generate a vacuum inside the chamber, thereby assisting the gripping of the suction cup. Although a single motor and pump assembly may be sufficient to extract air from the chamber and generate sufficient vacuum, for example a vacuum of the order of 50%, preferably, the air extraction means comprise two or more motor and pump assemblies connected in series, so as to achieve a higher vacuum, of the order of between 75% and 80% and in less time. It is of course envisaged that other combinations of motors and pumps may be present, such that one motor may drive two or more pumps or more motor and pump sets connected in series.

The size of the duct, which connects the air extraction means inside the chamber to the outside of the chamber, which may be a flexible, pressure feed pipe, must be suitable for the air transit of the vacuum generator and must be suitable for the vacuum generating mechanism. The diameter of the duct may be variable.

The duct or pneumatic circuit connecting the air extraction means inside the chamber to the outside of the chamber is made of a flexible material, preferably non-porous. This material can be, for example, plastic (such as PVC), rubber, silicones.

The suction cup does not require installation, it is easily and quickly attached to any smooth surface, preferably glass, and is easily repositionable. Its main objective for all types of shops is to maximize the visual impact of the product or object thus displayed, being able to customize the display tray with any type of material (glass, wood, plexiglass, aluminium, etc.), shape or graphics. Likewise, this system is considered a modular system, as several suction cups can hold a larger display tray both vertically and horizontally, offering a multitude of possibilities as a display, shelving system or advertising support.

In one embodiment, the pneumatic duct or circuit, which connects the air extraction means to the outside of the chamber, has a valve, thus preventing air from re-entering the chamber after being drawn out by the air extraction means. This valve could for example be a non-return valve arranged at the outlet of a pump, although preferably it is envisaged the valve being a solenoid valve arranged near the end of the duct closest to the outside of the chamber to prevent air from entering and reducing the air accumulated at atmospheric pressure inside the duct, which could reduce the vacuum in the chamber due to small leaks. The solenoid valve is intended to be of the normally closed type, so that when it is not powered, it closes the air passage through the duct. This valve will open to allow air to be expelled from inside the chamber to the outside, thereby reducing the pressure inside the chamber by creating a partial vacuum, and will close when the pressure inside the chamber is adequate, thus preventing the return of air and maintaining the pressure reduction as a partial vacuum inside the chamber that will allow the suction cup to properly adhere to a surface. The valve will also be opened to allow the entry of air inside the chamber to match the atmospheric pressure and thus allow the suction cup to be detached from the surface to which it is adhered. In addition, in order to achieve a more compact and quiet suction cup, it is also foreseen that the valve will be placed inside the vacuum chamber.

Although after opening the valve the air could enter the inside of the chamber through the air extraction means, for example, if these are not equipped with non-return means, or directly by activating them in a reverse way, it is foreseen, according to particular embodiments, that the duct connecting the air extraction means with the exterior of the chamber has a branch leading to the interior of the chamber equipped with an auxiliary valve, so that air can enter the interior of the chamber through this auxiliary valve, which must be suitably open in order to match the pressure inside the chamber with the outside pressure, thus allowing the suction cup to be easily detached from the surface.

It is envisaged that the auxiliary valve will also be a non-return valve or solenoid valve, of the normally closed type, which only opens to allow air to enter the chamber. This auxiliary valve may of course be arranged differently and communicate directly between the inside and the outside of the vacuum chamber in order to promote pressure balance.

This auxiliary valve can be inside or outside the vacuum chamber.

In one embodiment, the control means are adapted to stop the air extraction means when the pressure detected by the pressure sensor reaches a predetermined maximum value, for example −75 kPa (−0.75 bar), so that the air extraction means stop operating when they reach the necessary vacuum level to keep the suction cup attached to the surface when it is active.

According to preferred embodiments, the vacuum chamber has a parallelepiped shape, and preferably, the vacuum chamber has a parallelepiped shape in which the smallest dimension of said chamber is at least ⅓ of any of the other two dimensions (i.e. it is an essentially three-dimensional chamber as opposed to that disclosed by WO2018185527, according to which the vacuum chamber (which has the housing shape), has a parallelepiped shape which is essentially flat). The shape of the vacuum chamber according to WO2018185527 allows a much smaller grip to the surface on which it adheres than in the case where the chamber has three dimensions with a smaller difference among them with respect to its length, as in this embodiment of the present invention.

This embodiment has advantages over those in which the vacuum chamber has an essentially flat shape such as in WO2018185527 (according to which it is a rectangular parallelepiped), in which it is easy to detach the suction cup from the surface to which it is adhered, for example, with a lateral blow, so that it loses its ability to hold objects. Whereas, when the vacuum chamber has a polygon-shaped cross-section with more similar sides, such as a square, the gripping force on the surface on which the suction cup is placed is greater.

In a particularly preferred embodiment, the vacuum chamber according to the present invention has a cubic shape. The greater symmetry of the cubic shape compared to any other parallelepiped has the effect that the gripping force of the suction cup on the surface to which it is attached is even greater than in cases where the vacuum chamber is another parallelepiped or another essentially flat polyhedral shape.

According to another particular embodiment, the vacuum chamber is round or rounded, or even spherical in shape.

In a further particular embodiment, the suction cup has a hole which act as a display surface to support articles, so that it can hold articles inside it, and this hole may be a through-hole, so that the vacuum chamber has an annular cross-section. This hole may be in the form, for example, of a rectangular or square parallelepiped.

When the vacuum chamber has an annular cross-section (as opposed to a continuous hole), it encloses a space in which objects can be accommodated, so that the objects accommodated in the through-hole are not subjected to the vacuum. The vacuum is generated in the space surrounding the through-hole. In this case, the vacuum chamber has two elastic rims on its edges: one rim on the outer perimeter and a second rim on the inner perimeter of the chamber.

This embodiment also has advantages over those in which the vacuum chamber is essentially flat as in WO2018185527, in which it is easy to detach the suction cup from the surface to which it is attached, for example, with a lateral blow, thus losing its ability to hold objects. Whereas when the vacuum chamber is a perimeter space, i.e. it has an annular shape, the gripping force on the surface on which the suction cup is placed is greater.

In the case where the vacuum chamber has an annular cross-section, the air extraction means are arranged in the vacuum chamber, in the same way as in the other embodiments.

In a further embodiment, the suction cup comprises at least one coupling or hitch for attaching the arm of a tray for supporting articles. It is, of course, envisaged that this coupling can also be used to connect and hold other elements, for example a television set.

In a further embodiment of interest, the suction cup comprises two lateral couplings for attaching the respective arms of a tray for supporting articles, so that the display tray is stable and sufficiently secured.

A further embodiment relates to a suction cup arranged inside a housing, which may have various shapes, such that the suction cup has the housing shape.

Preferably, it is envisaged that the suction cup has an essentially parallelepiped-shaped housing with four rounded edges, facilitating a better grip by a user for installation on a flat surface. The vacuum chamber is preferably shaped like the housing, but it can be otherwise.

BRIEF DESCRIPTION OF THE DRAWINGS

In order to supplement the description being provided and to facilitate the understanding of the features of the invention, this description is accompanied by a set of drawings in which, by way of illustration and without limitation, the following has been shown.

DETAILED DESCRIPTION OF THE FIGURES

Figure 1:
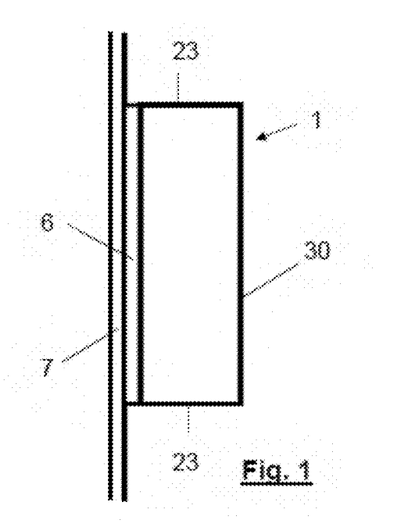
FIG. 1 shows a side-view of an example of a suction cup according to the invention attached to a surface.
Figure 2:
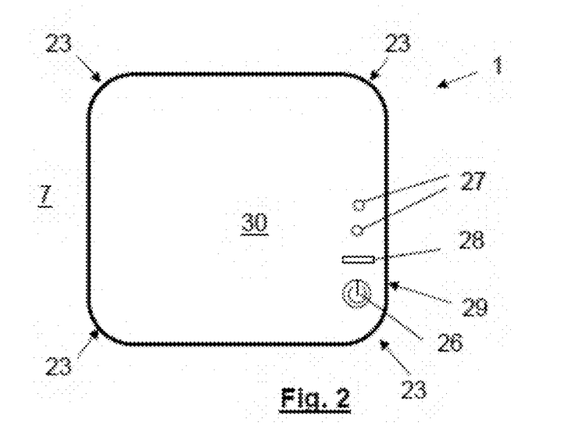
FIG. 2 shows a front view of the suction cup of FIG. 1.

FIGS. 1 and 2 show an active suction cup 1 according to the present invention, applied against a surface 7 to which it is intended to be adhered, so that it can be used to support objects. The suction cup 1 has a vacuum chamber 3 provided with an opening 5 with an elastic rim 6, formed for example by an elastomer along the perimeter of the opening 5 adapted to be applied against the surface 7 sealing the vacuum chamber 3, thus adopting the position shown in FIGS. 1 and 2.

The suction cup 1 has a control panel 29, in the embodiment shown, located on its front face 30, for the operation of the suction cup 1 by a user. Specifically, the control panel 29 of the suction cup 1 depicted includes an on/off button 26 adapted to activate or deactivate the suction cup 1 so as to cause the suction cup 1 to firmly adhere to, or detach from, the surface 7 as will be detailed below. It is envisaged that the suction cup 1 is powered by internal batteries, not shown, to power the various components of the suction cup 1, being the control panel 29 provided with a charging port 28, such as a USB port, suitable for recharging the batteries, suitably connected to a known type of recharging circuit. It is also envisaged that the control panel 29 is provided with one or more indicator lights 27, such as LEDs, to determine the status of the suction cup 1, for example, whether it is activated or to warn if the charge level of the batteries is low. It is also envisaged that the control panel 29 includes an acoustic warning device to provide audible warning signals.

It is further shown that the suction cup 1 is provided with a housing 24 having an essentially parallelepiped shape with four rounded rims 23, favouring its handling and giving it an attractive aesthetic finish.

Pressing the on/off button 26 an activation or deactivation signal is sent to internal control means 16 of the suction cup 1, connected to air extraction means 4 arranged inside the vacuum chamber 3 and connected to a duct 11 leading to the outside of the chamber 3, adapted to extract air from the inside of the chamber 3 to reduce the pressure inside the chamber 3 so that the suction cup 1 adheres to the surface 7. It is envisaged that the duct 11 may consist of several connected pipe sections.

The control means 16 are connected to a pressure sensor 15 arranged inside the chamber 3 to detect the pressure inside the chamber 3, the control means 16 being adapted and appropriately programmed to activate the air extraction means 4 if the pressure detected by the pressure sensor 15 is greater than a predetermined maximum pressure threshold, for example −60 kPa (−0.60 bar), to reduce the pressure inside the chamber 3 so that the suction cup 1 adheres to the surface 7. It is envisaged that the control means 16 may be arranged inside or outside the chamber 3 or be distributed, connected on the one hand with the components of the control panel 29 and on the other hand with the components inside the chamber 3 according to the diagram of FIGS. 3a and 3b. Naturally, the wiring connections between the inside and the outside of the chamber 3 shall be made in an airtight manner, to avoid pressure losses. It is usual to use in these cases airtight connectors of the type known as "feedthrough".

Figure 3A:
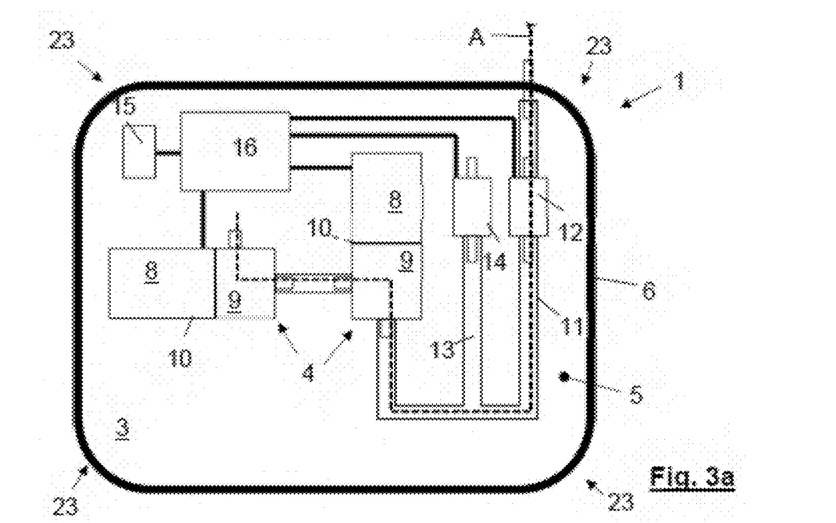
FIG. 3a shows a schematic rear-view of the suction cup of FIG. 1 during vacuum generation for attachment of the suction cup to the surface.

Specifically, FIG. 3a illustrates the appropriate configuration for extracting air from the interior of chamber 3 and thus achieving a pressure reduction or vacuum generation in chamber 3 that allows the suction cup 1 to be firmly attached to the surface 7. The air extraction from the interior of the chamber 3 in FIG. 3a is represented by the air outlet arrow A. In the configuration shown, the control means 16 drive the air extraction means 4, which in this case comprise an assembly 10 of motor 8 and pump 9, specifically two assemblies 10 of motor 8 and pump 9 connected in series. Furthermore, it can be seen that the suction cup 1 has inside the vacuum chamber 3 a solenoid valve 12 interposed in the duct 11. As can be observed, this valve 12 is also connected to the control means 16 and in the situation shown in FIG. 3a is open, to allow the air to escape as indicated by the air outlet arrow A.

Although, the control means 16 may operate the air extraction means 4 for a predetermined time until it is determined that the pressure inside the chamber 3 returns below the predetermined maximum pressure threshold, preferably, the control means 16 will be adapted to stop the air extraction means 4 when the pressure detected by the pressure sensor 15 reaches a predetermined maximum pressure threshold, −60 kPa (−0.60 Bar) for example.

As long as the pressure inside the chamber 3 remains below the predetermined maximum pressure threshold, the suction cup 1 will remain sufficiently adhered to the surface, without requiring the air extraction means 4 to be constantly in operation. It will only be necessary for the control means 16 to periodically monitor the pressure inside the chamber 3 provided by the pressure sensor 15 to determine when it is necessary to re-actuate the air extraction means 4, to reduce the pressure inside the chamber 3 again. In this way, the energy cost of keeping the suction cup 1 adhered to the surface 7 is very low.

If at any time it is necessary to detach the suction cup 1 from the surface 7, the user will indicate this by pressing the on/off button 26 again, so that a deactivation signal will be sent to the control means 16.

Figure 3B:
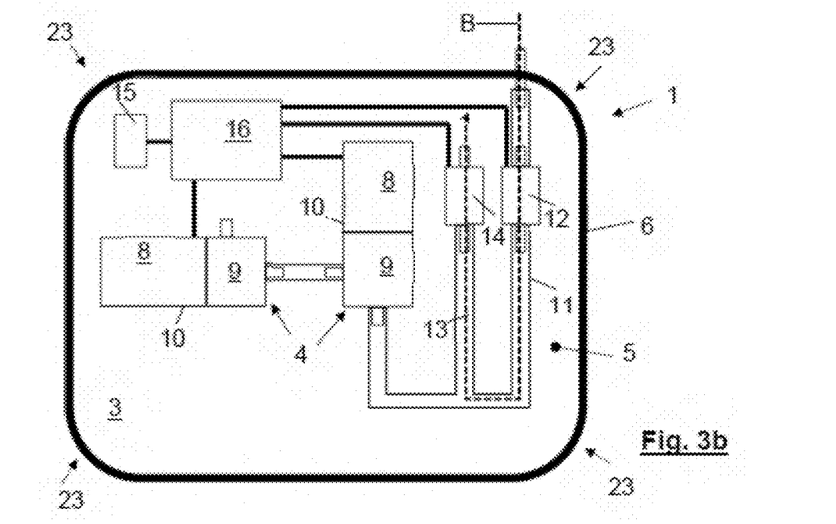
FIG. 3b shows a schematic rear-view of the suction cup of FIG. 1 during vacuum generation for separation of the suction cup from the surface.

As illustrated in FIG. 3b, in order to match the pressure inside and outside the vacuum chamber 3, the control means 16 will open the valve 12, as well as an auxiliary valve 14 of a branch 13 of the duct 11 leading into the interior of the chamber 3, thereby promoting air intake as represented by the air inlet arrow B. It is envisaged that the auxiliary valve 14 is also a solenoid valve. Naturally during this operation, the control means 16 will not actuate the air extraction means 4 even if the pressure in the chamber 3 rises above the predetermined maximum pressure threshold.

Figure 4:
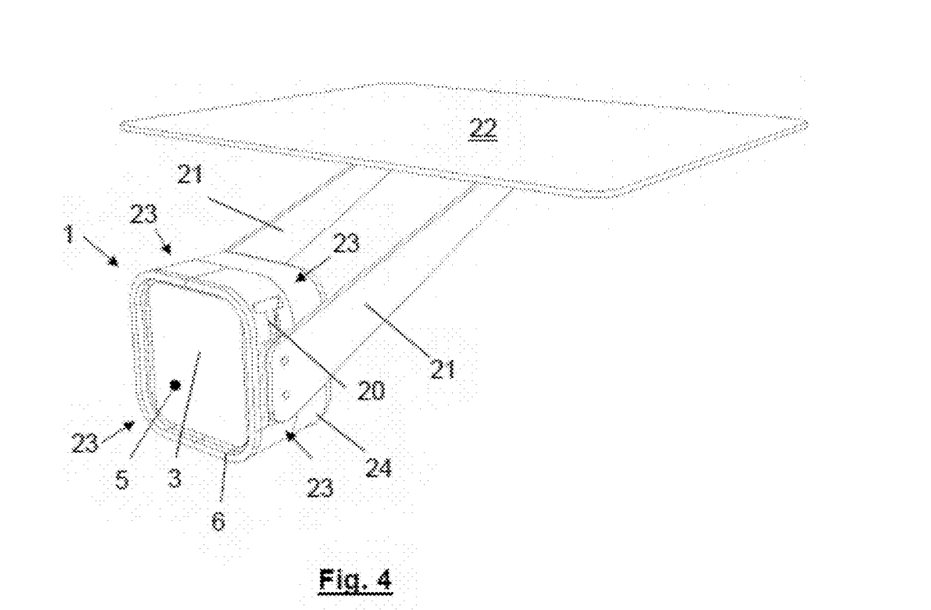
FIG. 4 shows a suction cup according to the invention provided with a display tray.

FIG. 4 depicts a suction cup 1 according to the present invention comprising at least one coupling 20 for engaging the arm 21 of a display tray 22. Specifically, the suction cup 1 comprises two lateral couplings 20 for coupling respective arms 21 of a display tray 22 for supporting articles. In this case, if we have an opening 5 of the chamber 3 that determines an area of adherence to the surface 7 of approximately 10×10 cm (it could be larger), the result is that the suction cup 1 can support at 10 cm from the surface 7 to which it is adhered, more than 20 kg as an action of the moment of force. If we carry out the same test with the object at 40 cm from the surface 7, the display tray 22 supports more than 5 kg. Other suction cup models 1, depending on the area and degree of vacuum, can support a greater or lesser amount of weight. The period of time that the weight can be supported on the display tray 22 depends on the number of times the vacuum generation system is kept in operation and consequently on the wear and tear of the batteries. Tests show that if a vacuum is generated once every 72 hours the system could support 5 kg at 40 cm from the fixing surface for more than 4 years.

Figure 5:
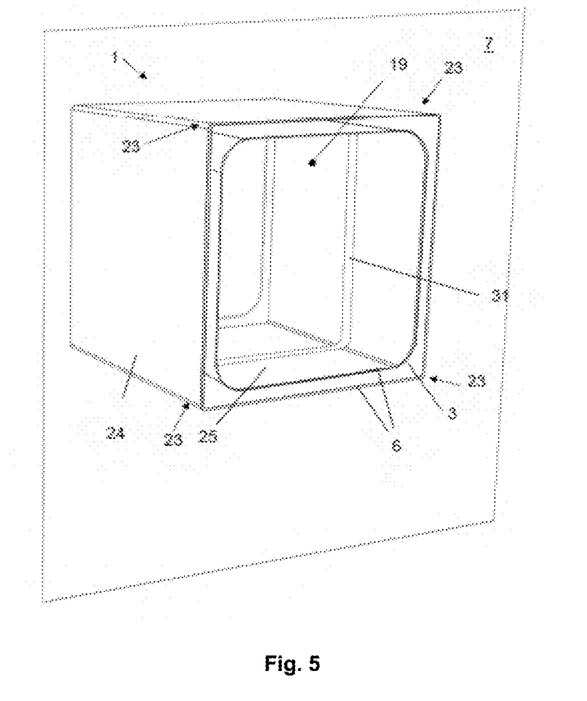
FIG. 5 shows another suction cup according to the invention provided with a shelf-like hole.
Figure 6:
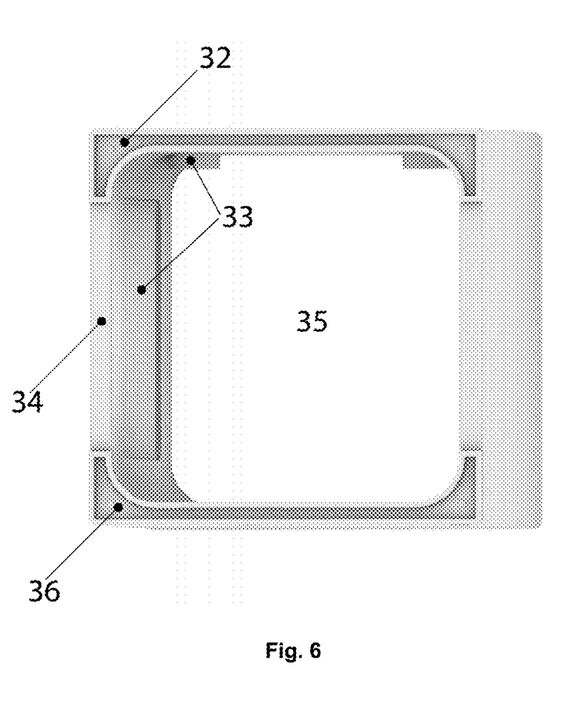
FIG. 6 shows a view of a particular embodiment of the suction cup, wherein the vacuum chamber has a perimeter shape, and surrounds the through-hole (35), in which the following elements are shown, the rims (32) and (36), (33): lighting, (34): wall wherein the vacuum generating elements will be placed.
Figure 7:
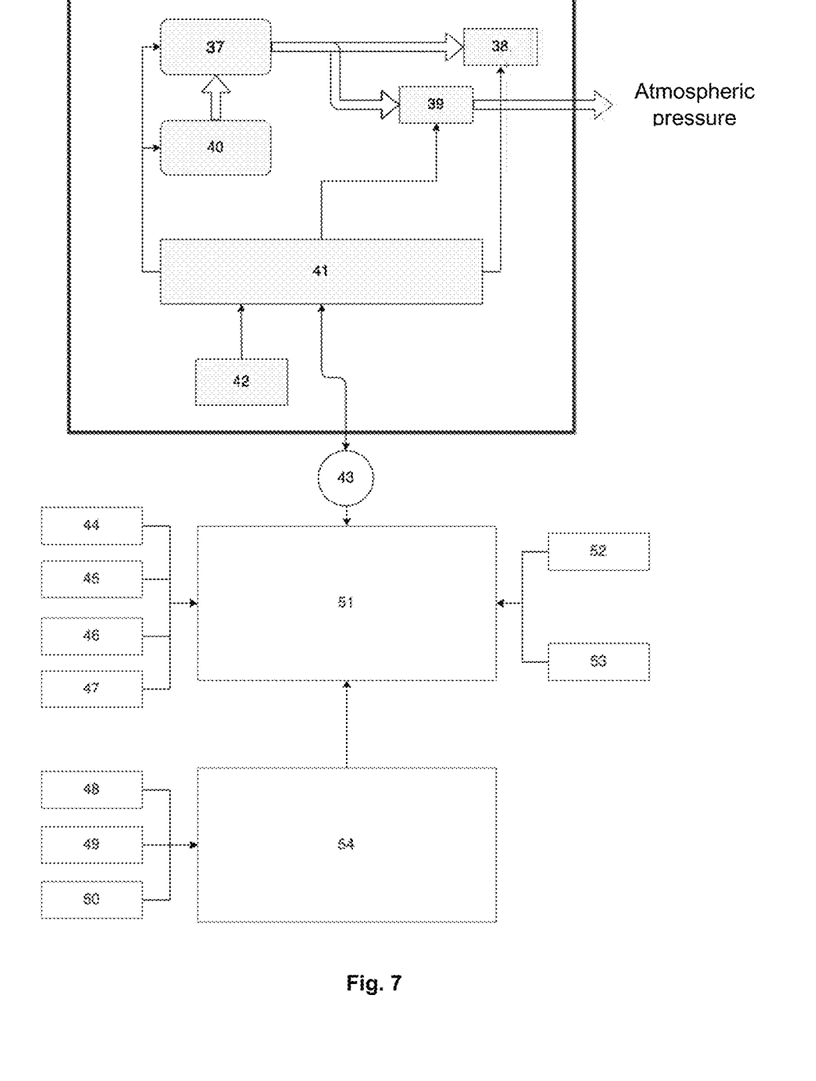
FIG. 7 shows a view of a particular embodiment of the suction cup wherein the vacuum chamber is represented by the upper square enclosing elements 37 to 42, and the rest of the electronic components arranged outside it. The thick arrows refer to the pneumatic system and the thin arrows refer to connections of the electronic system. In this figure:
37 and 40: motors
38, 39: solenoid valves
41, 42: interconnectors
43: feedthrough
44, 45, 46, 47, 48, 49 and 50: connections to PCBs, at user-level
51 and 54: PCB boards
52 and 53: batteries or storage cells.
Figure 8:
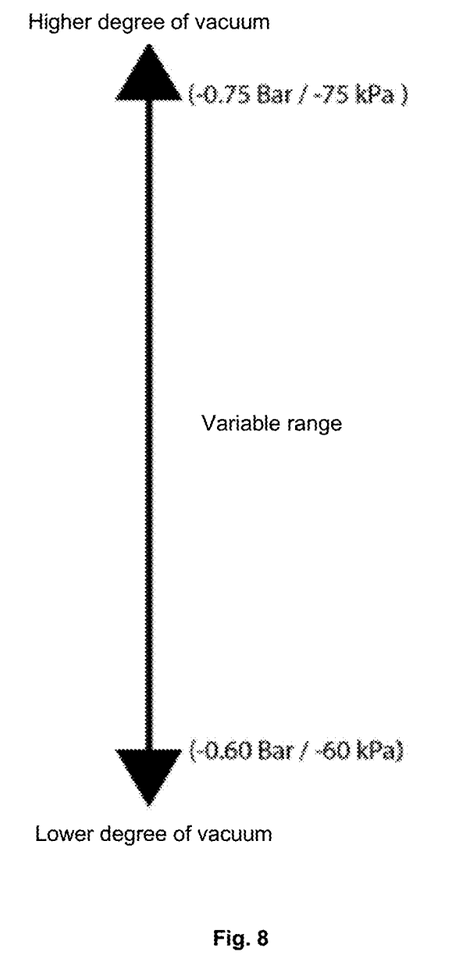
FIG. 8 shows a diagram of the interpretation of the pressure or negative pressure parameter, according to the specification.

FIG. 5 represents another embodiment of the suction cup 1 according to the present invention which has a hole 19 as a shelf 25 for supporting items. Since the hole 19 of this suction cup 1 is a through-hole, the vacuum chamber 3 will have an annular cross-section, and therefore the elastic rim 6 will be arranged on both the outer and inner perimeter of the opening 5. It is further envisaged that the hole 19 is provided with lighting means 31, for example a led strip integrated in the housing 24 of the suction cup 1.

The invention claimed is:

1. An active suction cup comprising:
   a vacuum chamber provided with at least one opening with an elastic rim adapted to be applied to a surface sealing the vacuum chamber;
   a plurality of elements for extracting air from inside the vacuum chamber to reduce a pressure inside the vacuum chamber so that the suction cup adheres to the surface, wherein the plurality of elements for extracting air are arranged inside the vacuum chamber;
   a duct connected between the vacuum chamber and outside of the vacuum chamber;
   a pressure sensor inside the vacuum chamber to detect the pressure inside the vacuum chamber,
   a controller connected to the pressure sensor and adapted to actuate the plurality of elements for extracting the air if the pressure detected by the pressure sensor is lower than a predetermined pressure threshold.

2. The suction cup of claim 1, wherein the plurality of elements for extracting the air comprise an assembly of motor and pump.

3. The suction cup of claim 1, wherein the plurality of elements for extracting the air comprise two sets of motor and pump connected in series.

4. The suction cup of claim 1, wherein the duct has a valve.

5. The suction cup of claim 4, wherein the valve is arranged inside the vacuum chamber.

6. The suction cup of claim 4, wherein the valve is a solenoid valve.

7. The suction cup of claim 1, wherein the duct has a branch leading into an interior of the vacuum chamber provided with an auxiliary valve.

8. The suction cup of claim 7, wherein the auxiliary valve is a solenoid valve.

9. The suction cup of claim 1, wherein the controller is adapted to stop the plurality of elements for extracting the air when the pressure detected by the pressure sensor reaches a predetermined minimum pressure threshold.

10. The suction cup of claim 1, comprising a hole that determines a shelf.

11. The suction cup of claim 10, wherein the hole is a through-hole.

12. The suction cup of claim 1, comprising at least one coupling for attaching an arm of a display tray.

13. The suction cup of claim 12, comprising two couplings, wherein each of the two couplings attaches to a corresponding arm of the display tray.

14. The suction cup of claim 1, comprising an essentially parallelepiped-shaped housing with four rounded rims.

* * * * *